(12) United States Patent
Su et al.

(10) Patent No.: US 7,704,648 B2
(45) Date of Patent: Apr. 27, 2010

(54) COLOR FILTER SUBSTRATE AND FABRICATING METHOD THEREOF

(75) Inventors: Ta-Jung Su, Changhua County (TW); Shu-Min Wu, Yilan (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 1171 days.

(21) Appl. No.: 11/161,311

(22) Filed: Jul. 29, 2005

(65) Prior Publication Data

US 2007/0003845 A1 Jan. 4, 2007

(30) Foreign Application Priority Data

Jul. 1, 2005 (TW) ............... 94122272 A

(51) Int. Cl.
G02B 5/20 (2006.01)
G02F 1/1335 (2006.01)

(52) U.S. Cl. ........................................ 430/7
(58) Field of Classification Search ............ None
See application file for complete search history.

(56) References Cited

U.S. PATENT DOCUMENTS

2002/0090494 A1* 7/2002 Song ............... 428/167

FOREIGN PATENT DOCUMENTS

| CN | 1598623 | 3/2005 |
|---|---|---|
| JP | 04-163428 | 6/1992 |
| JP | 7-198924 A * | 8/1995 |
| JP | 7-287114 A * | 10/1995 |
| JP | 2000-028821 | 1/2000 |
| JP | 2004-163979 | 6/2004 |

OTHER PUBLICATIONS

Computer-generated translation of JP 7-287114 (Oct. 1995).*
Computer-generated translation of JP 7-198924 (Aug. 1995).*

* cited by examiner

*Primary Examiner*—John A. McPherson
(74) *Attorney, Agent, or Firm*—Jianq Chyun IP Office

(57) ABSTRACT

A color filter substrate including a substrate, a black matrix, a plurality of color filter patterns and a common electrode is provided. The substrate has a plurality of pixel regions thereon. The black matrix comprises a plurality of strip patterns, wherein the strip patterns are disposed between the pixel regions to isolate the pixel regions, and each strip pattern has a side portion distant from the substrate and extending to the edge of the adjacent pixel region. Each color filter pattern is disposed in each pixel region. The common electrode is disposed over the substrate and covering the color filter patterns and the black matrix.

12 Claims, 10 Drawing Sheets

COLOR FILTER SUBSTRATE AND FABRICATING METHOD THEREOF

CROSS-REFERENCE TO RELATED APPLICATION

This application claims the priority benefit of Taiwan application Ser. No. 94122272, filed on Jul. 1, 2005. All disclosure of the Taiwan application is incorporated herein by reference.

BACKGROUND OF THE INVENTION

1. Field of the Invention

The present invention generally relates to a color filter substrate and a fabricating method thereof. More particularly, the present invention relates to a color filter substrate and a fabricating method thereof capable of providing good displaying contrast and wide viewing angle.

2. Description of Related Art

With recent advancement in opto-electronic fabricating techniques and the maturity of semiconductor manufacturing processes, the development of display devices have proceeded quite rapidly. Liquid crystal displays having advantages of good displaying quality, low power consuming and non-radiation become the next generation for the flat panel display.

FIG. 1 is a cross-section view showing a conventional liquid crystal display panel. As shown in FIG. 1, the liquid crystal display panel 100 includes an active device array substrate 110, a color filter substrate 120 and a liquid crystal layer 130 between the two substrates. The active device array substrate 110 comprises active devices 112 and pixel electrodes 114 electrically connected to the active devices 112. The color filter substrate 120 comprises a substrate 102, a black matrix 122, color filter patterns 124 and a common electrode 126. The method of forming the color filter substrate 120 in the prior art is as follows.

FIG. 2A~FIG. 2C are cross-section views showing a conventional method of fabricating a color filter substrate. As shown in FIG. 2A, a black matrix 122 constituted of a plurality of strip patterns (as shown in FIG. 3) is formed on a substrate 102 so as to define a plurality of pixel regions 104 on the substrate 102. As shown in FIG. 2B, color filter patterns 124 are formed in the pixel regions 104 by performing coating and photolithography processes. The color filter patterns 124 comprises red filter patterns R, green filter patterns G and blue filter patterns B. Next, as shown in FIG. 2C, a common electrode 126 is formed over the substrate 102 to cover the color filter patterns R, G, B and the black matrix 122. Thus, a color filter substrate 120 is completed.

Please refer to FIG. 1, the black matrix 122 is used for shielding light so as to prevent light leakage such that the displaying contrast of the liquid crystal display panel 100 can be increased. In addition, if light from a back light module (not shown) or reflected by the films in the display panel passes through the point p and may transmit outside the liquid crystal display panel 100, the liquid crystal display panel 100 has a viewing angle of θ. In other words, when people view the liquid crystal display panel 100 with a viewing angle larger than θ, the displaying contrast is poor comparing with when people view the liquid crystal display panel 100 with a viewing angle smaller than θ.

Conventionally, the viewing angle of the liquid crystal display panel 100 can be improved by increasing the width of the black matrix 122. However, the aperture ratio of the liquid crystal display panel 100 is deteriorated. Therefore, how to increase shielding efficiency of the black matrix without deteriorating the aperture ratio of the display panel is important.

SUMMARY OF THE INVENTION

Accordingly, the present invention is directed to a method of fabricating a color filter substrate capable of increasing shielding efficiency of the black matrix without deteriorating the aperture ratio.

The present invention is directed to a method of fabricating a color filter substrate capable of preventing light leakage.

The present invention is directed to a color filter substrate capable of preventing light leakage so as to improve displaying contrast and viewing angle of a display.

According to an embodiment of the present invention, a method of fabricating a color filter substrate is provided. A substrate having a plurality of pixel regions thereon is provided. A plurality of strip patterns are formed between the pixel regions to form a black matrix isolating the pixel regions, wherein each strip pattern has a side portion distant from the substrate and extending to the edge of the adjacent pixel regions. A color filter pattern is formed in each pixel region. A common electrode is formed over the substrate to cover the color filter patterns and the black matrix.

According to an embodiment of the present invention, the method of forming said black matrix comprises the following steps. A first mask pattern is formed in each pixel region, wherein the top portion of each first mask pattern has a width smaller than that of the bottom portion of each first mask pattern. A second mask pattern is formed on each first mask pattern, wherein the top portion of each second mask pattern has a width larger than that of the bottom portion of each second mask pattern. A shielding layer is formed on the top portion of the second mask patterns, wherein the black matrix is also formed on the substrate between the first mask patterns at the same time, and the black matrix is separated from the shielding layer. Thereafter, the shielding layer, the second mask patterns and the first mask patterns are removed.

According to an embodiment of the present invention, said depositing process comprises a physical vapor deposition, a plasma-enhanced chemical vapor deposition, an evaporation process or a coating process.

According to an embodiment of the present invention, said second mask patterns have a shape of trapezoid having a top width larger than a bottom width. According to an embodiment of the present invention, each second mask pattern has at least a protruding portion on its top portion.

According to an embodiment of the present invention, the method of forming said black matrix comprises following steps. A plurality of auxiliary patterns are formed on the substrate, wherein each auxiliary pattern extends from the inside of each pixel region to the edge of each pixel region. A conformal shielding layer is formed over the substrate to cover the auxiliary patterns. The shielding layer and the auxiliary patterns in the pixel regions are removed so as to form the black matrix on the substrate.

According to an embodiment of the present invention, the method of forming the shielding layer comprises performing a physical vapor deposition, a plasma enhanced chemical vapor deposition, an evaporation process or a coating process.

According to an embodiment of the present invention, after forming the color filter patterns and before forming the common electrode, the method further comprises forming a planarizing layer over the substrate to cover the color filter patterns and the black matrix.

According to another embodiment of the present invention, a method of fabricating a color filter substrate is provided. A plurality of color filter patterns are formed on a substrate, wherein the color filter patterns expose a portion of the substrate. A black matrix is formed on the exposed substrate, and the black matrix covers a portion of each color filter pattern. A common electrode is formed over the substrate to cover the color filter patterns and the black matrix.

According to an embodiment of the present invention, the method of forming said black matrix comprises following steps. A shielding layer is formed over the substrate to cover the color filter patterns. The shielding layer on the color filter patterns is removed so as to form the black matrix on the substrate.

According to an embodiment of the present invention, wherein the method of forming the shielding layer comprises performing a physical vapor deposition, a plasma enhanced chemical vapor deposition, an evaporation process or a coating process.

According to an embodiment of the present invention, after forming the color filter patterns and before forming the common electrode, the method further comprises forming a planarizing layer over the substrate to cover the color filter patterns and the black matrix.

According to an embodiment of the present invention, a color filter substrate comprising a substrate, a black matrix, a plurality of color filter patterns and a common electrode is provided. The substrate has a plurality of pixel regions thereon. The black matrix comprises a plurality of strip patterns, wherein the strip patterns are disposed between the pixel regions to isolate the pixel regions. Each strip pattern has a side portion distant from the substrate and extending to the edge of the adjacent pixel regions. Each color filter pattern is disposed in each pixel region. The common electrode is disposed over the substrate and covering the color filter patterns and the black matrix.

According to an embodiment of the present invention, said color filter patterns comprises at least one red filter pattern, at least one green filter pattern and at least one blue filter pattern.

According to an embodiment of the present invention, said black matrix comprises a non-transparent metal material or a photo-sensitive black organic material. In addition, the black matrix is a single-layer structure or a multi-layer structure.

According to an embodiment of the present invention, said the black matrix covers a portion of each color filter pattern.

According to an embodiment of the present invention, said side portion of each strip pattern of the black matrix and the substrate have an included angle smaller than 90 degree.

According to an embodiment of the present invention, said color filter substrate further comprises a plurality of protrusions disposed between each strip pattern and each color filter pattern, and the side portion of each strip pattern is leaned on each the protrusion correspondingly.

According to an embodiment of the present invention, said color filter substrate further comprises a planarizing layer disposed between the common electrode and the color filter patterns and the black matrix.

In the present invention, the strip patterns of the black matrix have a side portion distant from the substrate so as to prevent light leakage at a wider viewing angle. Since the width of the black matrix is not increased in the present invention, the liquid crystal display panel of the present invention has a wider viewing angle without deteriorating the opening ratio (or aperture ratio). Therefore, the liquid crystal display panel has advantages of wider viewing angle and good displaying contrast.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
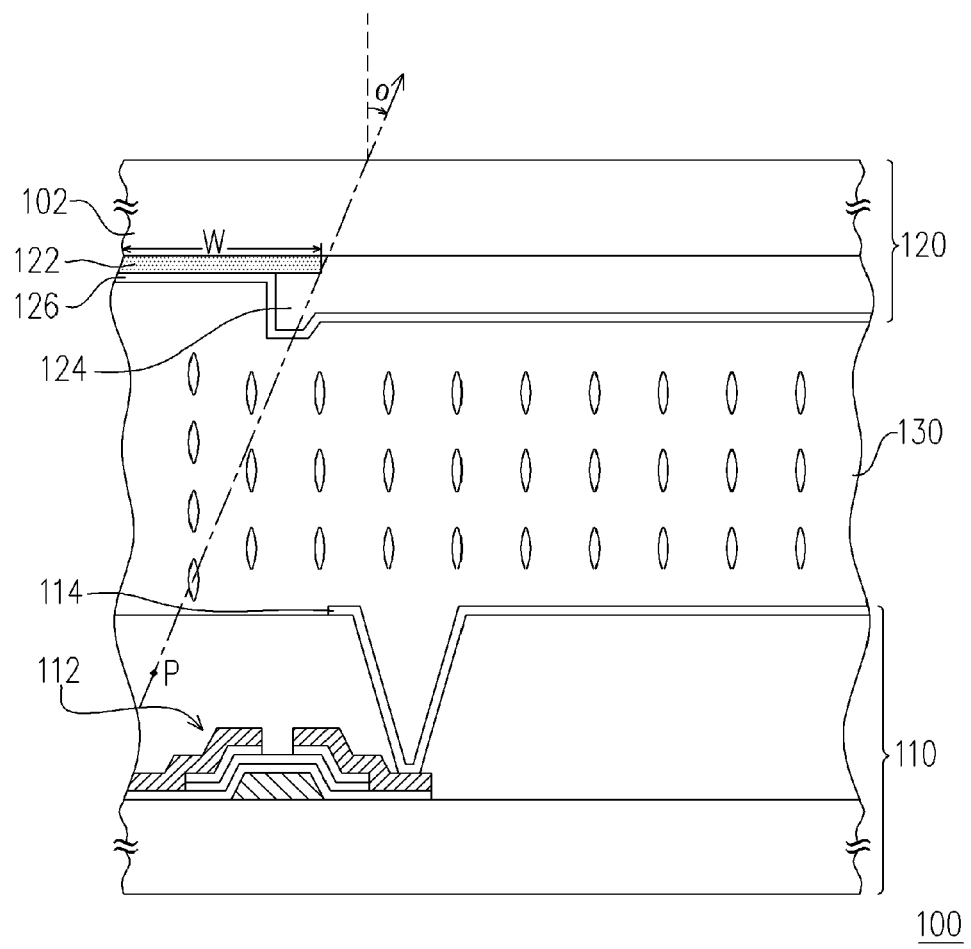
FIG. 1 is a cross-section view showing a conventional liquid crystal display panel.
Figure 2A:
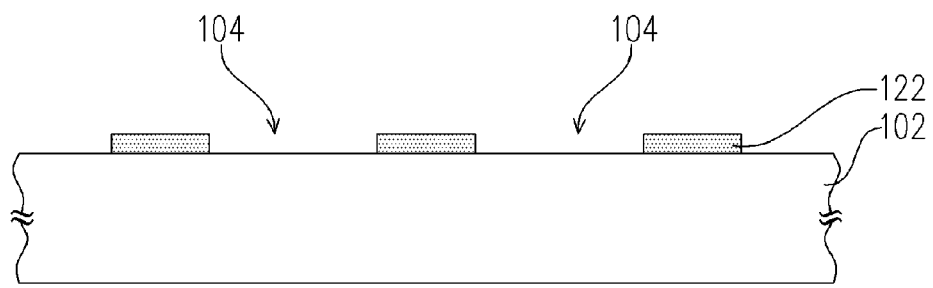
FIG. 2A~FIG. 2C are cross-section views showing a method of fabricating a color filter substrate in the prior art.
Figure 2B:
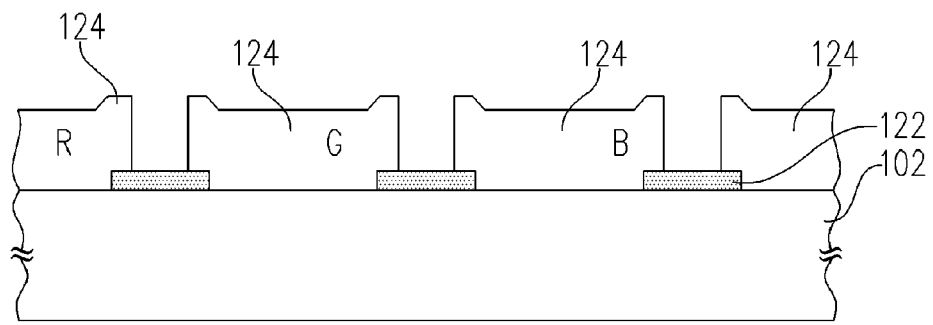
Figure 2C:
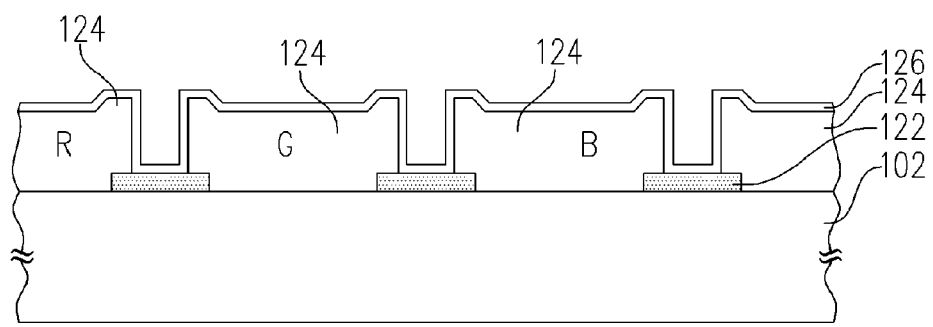
Figure 3:
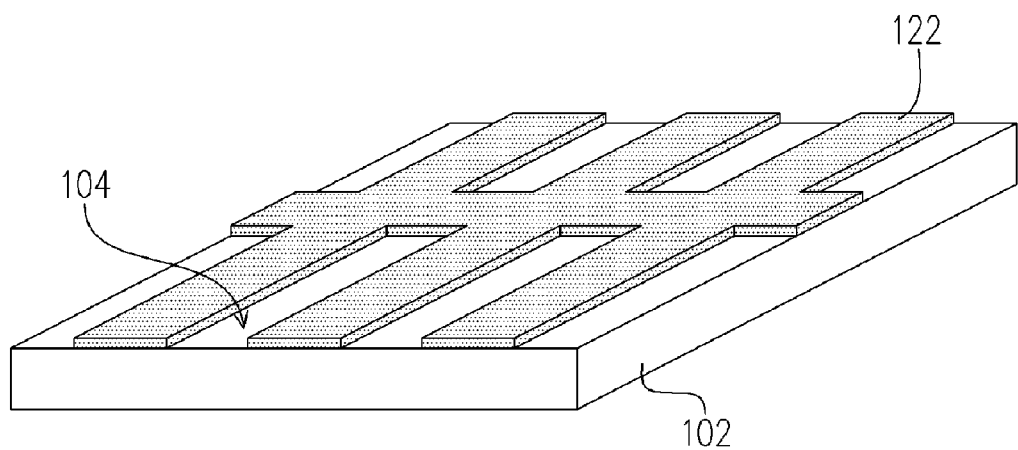
FIG. 3 is a perspective view showing the structure of FIG. 2A.

Reference will now be made in detail to the present preferred embodiments of the invention, examples of which are illustrated in the accompanying drawings. Wherever possible, the same reference numbers are used in the drawings and the description to refer to the same or like parts.

In the present invention, a specific black matrix is formed on a color filter substrate to improve its shielding efficiency. The embodiments in the follows are used for illustration but not limit the present invention. It will be apparent to those skilled in the art that various modifications and variations can be made to the structure of the present invention without departing from the scope or spirit of the invention.

First Embodiment

Figure 4A:
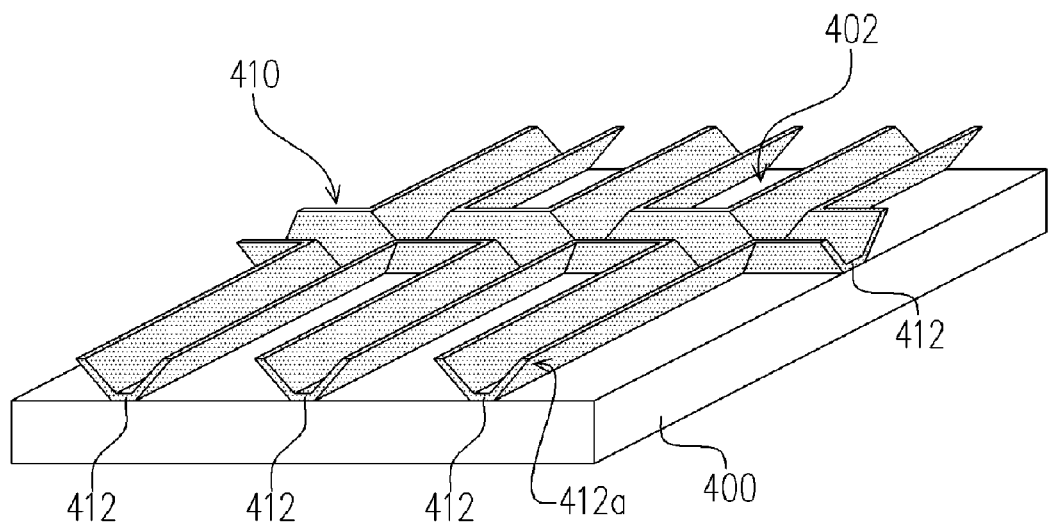
FIG. 4A is a perspective view showing a black matrix on a substrate according to a first embodiment of the present invention.
Figure 4B:
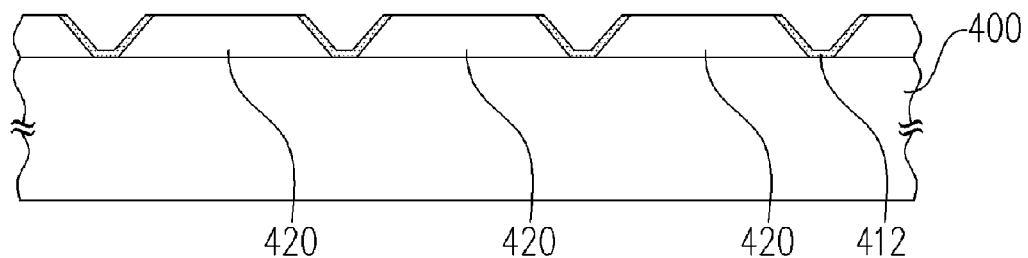
FIG. 4B~FIG. 4C are cross-section views showing a method of fabricating a color filter substrate after the step of FIG. 4A.
Figure 4C:
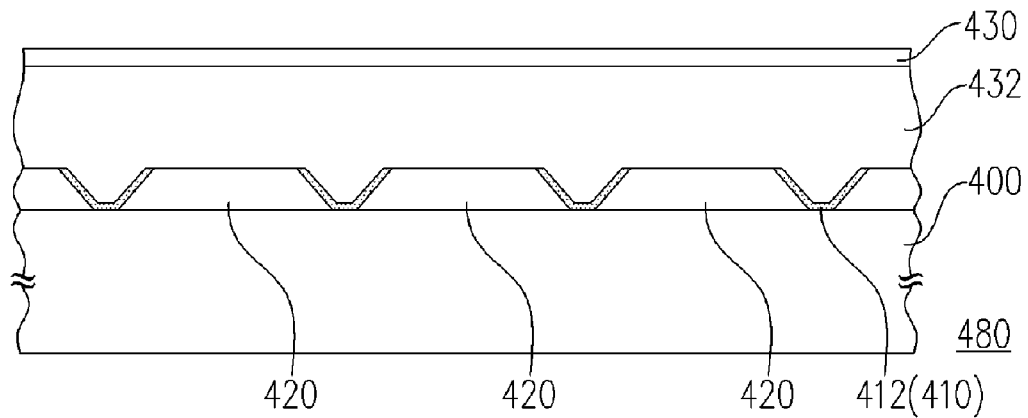

FIG. 4A is a perspective view showing a black matrix on a substrate according to a first embodiment of the present invention. FIG. 4B~FIG. 4C are cross-section views showing a method of fabricating a color filter substrate after the step of FIG. 4A. As shown in FIG. 4A, a substrate 400 having a plurality of pixel regions 402 thereon is provided. A plurality of strip patterns 412 are formed between the pixel regions 402 so as to form a black matrix 410 on the substrate 400.

It should be noted that in the sequential process, color filter patterns (not shown) are formed in the pixel regions 402. In an embodiment, the color filter patterns comprises at least one red filter pattern, at least one green filter pattern and at least one blue filter pattern. These color filter patterns can be arranged as mosaic type arrangement, stripe type arrangement, four pixel type arrangement or triangle type arrangement. The arrangement of the pixel regions 402 is in accordance with the color filter patterns. FIG. 4A shows one of the arrangements of the pixel regions but the arrangement of the pixel regions is not limited herein.

In addition, each strip pattern 412 has a side portion 412a distant from the substrate 400, and the side portion 412a of strip pattern 412 extends to the edge of the adjacent pixel region 402. In the embodiment, the side portion 412a of each strip pattern 412 and the substrate 400 has an included angle smaller that 90 degree. The method of forming the black matrix 410 is described as follows.

Figure 5A:
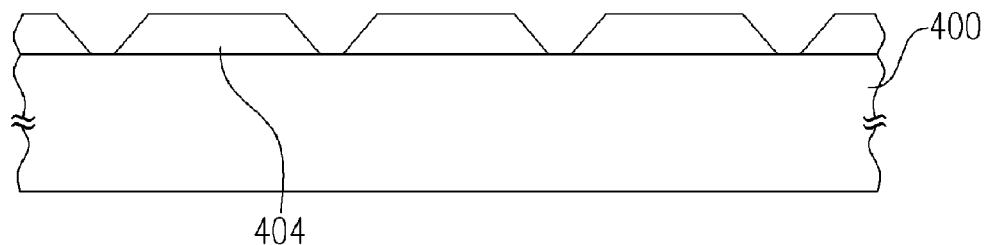
FIG. 5A~FIG. 5C are cross-section views showing a method of forming the black matrix 410 of FIG. 4A.
Figure 5B:
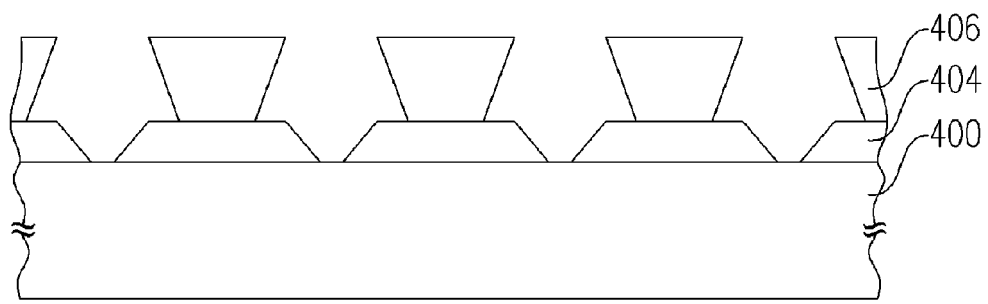
Figure 5C:
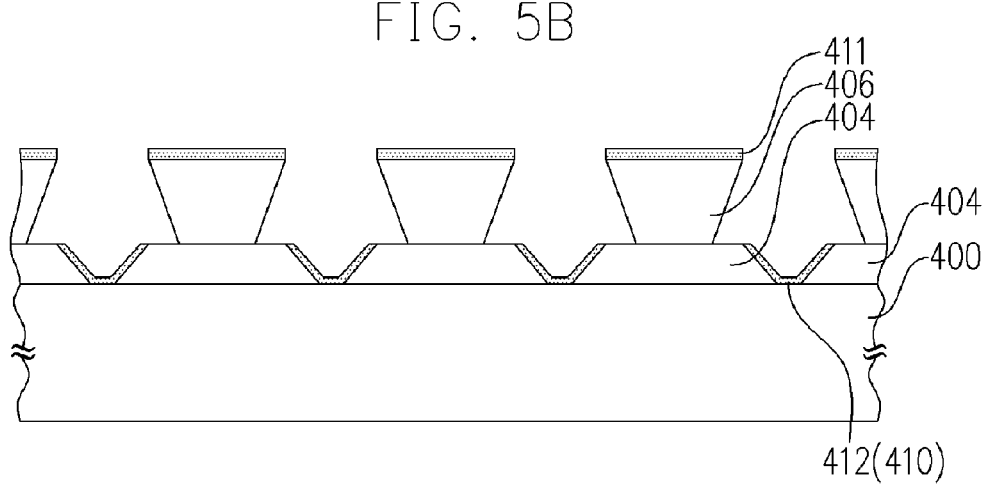

FIG. 5A~FIG. 5C are cross-section views showing a method of forming the black matrix 410 of FIG. 4A. As shown in FIG. 5A, a first mask pattern 404 is formed in each pixel region 402 of FIG. 4A. These first mask patterns 404 are composed of a photo-sensitive material, for example. The first mask patterns 404 are formed by the following steps. A photo-sensitive material (not shown) is formed over the substrate 400, and the photo-sensitive material outside the pixel regions 402 is removed by photolithography process so as to form the first mask patterns 404 in the pixel regions 402. In particular, the top portion of each first mask pattern 404 has a width smaller than that of the bottom portion of each first mask pattern 404. In other words, each first mask pattern 404 has a shape of trapezoid having a top width smaller than a bottom width.

Figure 6:
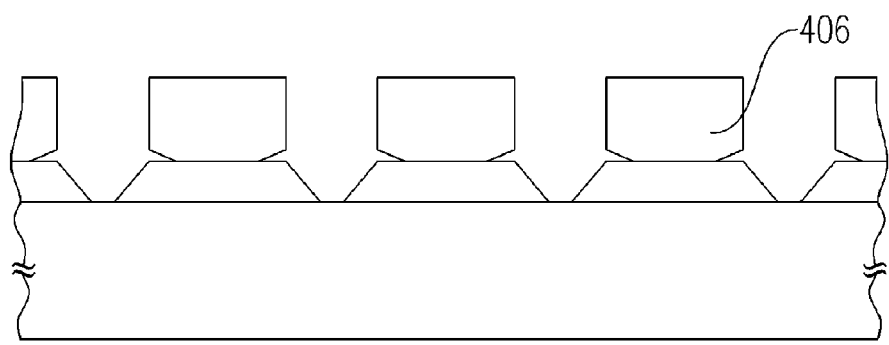
FIG. 6 and FIG. 7 are cross-section views respectively showing second mask patterns according two embodiments of the present invention.

As shown in FIG. 5B, a second mask pattern 406 is formed on each first mask pattern 404. Similarly, the second mask patterns 406 are composed of a photo-sensitive material, for example. The method of forming the second mask patterns 406 is the same or similar to that of forming the first mask patterns 404. In particular, the bottom portion of each second mask pattern 406 has a width smaller than that of the top portion of each second mask pattern 406. In an embodiment, each second mask pattern 406 has a shape of trapezoid having a top width larger than a bottom width thereof. Also, the second mask patterns 406 may also have a pattern as shown in FIG. 6 according to another embodiment of the present invention.

Figure 7:
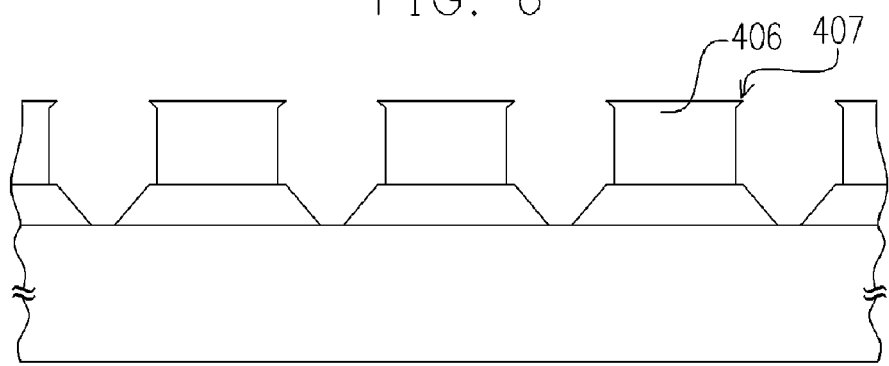

According to another embodiment of the present invention, each second mask pattern 406 may has a protruding portion 407 on its top portion, as shown in FIG. 7. The second mask pattern 406 having the protruding portion 407 has a function the same or similar to that of the second mask pattern 406 having a shape of trapezoid of FIG. 5B.

As shown in FIG. 5C, a depositing process is performed by using the second mask patterns 406 as mask to form a shielding layer 411 on the second mask patterns 406, and a black matrix 410 composed of a plurality of strip patterns 412 may also be formed on the substrate 400 between the first mask patterns 404 at the same time. The shielding layer 411 and the black matrix 410 are formed in the same depositing process and have a material constituted of a non-transparent metal material or a black photo-sensitive organic material, for example. In another embodiment, the shielding layer 411 and the black matrix 410 can also be a multi-layer film by performing several depositing processes. In other words, the shielding layer 411 and the black matrix 410 can be a single-layer structure or a multi-layer structure, respectively.

In addition, the depositing process for the shielding layer 411 and the black matrix 410 is in accordance with the material used for. The depositing process can be a physical vapor deposition, a plasma-enhanced chemical vapor deposition, an evaporation process or a coating process, for example.

In particular, each second mask pattern 406 has a profile having a larger top portion and a smaller bottom portion so that the shielding layer 411 is separated from the black matrix 410 during the depositing process. Therefore, after the shielding layer 411, the first mask patterns 404 and the second mask patterns 406 are removed, the black matrix 410 of FIG. 4A is formed.

Please refer to FIG. 4B, a color filter pattern 420 is formed in each pixel region between the black matrix 410 by using a coating process, for example. Thereafter, as shown in FIG. 4C, a common electrode 430 is formed over the substrate 400 to cover the color filter patterns 420 and the black matrix 410. The common electrode 430 is a transparent conductive oxide, such as indium tin oxide (ITO) or indium zinc oxide (IZO). In another embodiment, before forming the common electrode 420, a planarizing layer 432 may also be formed over the substrate 400 to cover the color filter patterns 420 and the black matrix 410.

After the step of FIG. 4C, the color filter substrate of the present invention is completed nearly. The sequential cutting process and testing process are well known and are omitted. The structure of the color filter substrate formed by the above mentioned method is described as follows.

FIG. 4C is a cross-section view showing a color filter substrate according to the first embodiment of the present invention. Please refer to FIG. 4A and FIG. 4C, the color filter substrate 480 comprises a substrate 400, a black matrix 410, color filter patterns 420 and a common electrode 430. The substrate 400 has a plurality of pixel regions 402 thereon. The black matrix 410 comprises a plurality of strip patterns 412 disposed between the pixel regions 402 to isolate these pixel regions 402. In an embodiment, the black matrix 410 has a material comprising a non-transparent metal material or a black photo-sensitive organic material. The black matrix 410 can be a single-layer structure or a multi-layer structure stacked by several material layers.

Moreover, the color filter patterns 420 are disposed in the pixel regions 402 as above mentioned. The color filter patterns 420 comprises at least one red filter pattern, at least one green filter pattern and at least one blue filter pattern, and these color filter patterns can be arranged as mosaic type arrangement, stripe type arrangement, four pixel type arrangement or triangle type arrangement.

In addition, the common electrode 430 is disposed over the substrate 400 to cover the black matrix 410 and the color filter patterns 420. In another embodiment, the color filter substrate 480 further comprises a planarizing layer 432 between the common electrode 430 and the black matrix 410 and the color filter patterns 420.

Figure 8:
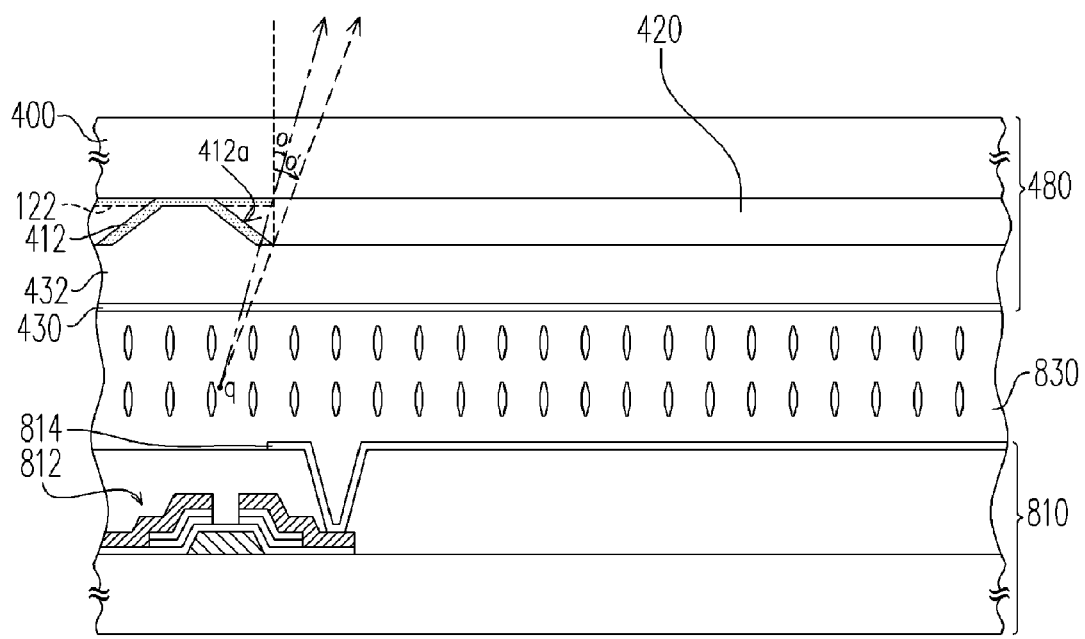
FIG. 8 is a cross-section view showing a liquid crystal display panel having the color filter substrate of the first embodiment therein.

FIG. 8 is a cross-section view showing a liquid crystal display panel having the color filter substrate of the first embodiment therein. As shown in FIG. 8, the liquid crystal display panel 800 comprises an active device array substrate 810, a color filter substrate 480 and a liquid crystal layer 830 between the two substrates. The active device array substrate 810 comprises a plurality of active devices 812 and pixel electrodes 814 electrically connected to the active devices 812. If light passes through the point q and transmits out of the liquid crystal display panel 800, the viewing angle can be increased from θ to θ' because the side portion 412a of the strip pattern 412 of the black matrix is distant from the substrate 400 and extends to the edge of the adjacent pixel regions. In addition, the width of the strip pattern 412 of the black matrix is the same or similar to that of the strip pattern 122 of the black matrix in FIG. 1 so that the shielding efficiency of the black matrix of the color filter substrate 480 in the present invention can be improved without increasing the width of the black matrix. Therefore, the liquid crystal display panel 800 has a wider viewing angle without deteriorating the opening ratio (or aperture ratio). In another embodiment, if the viewing angle of the display panel is maintained similar to the conventional condition, the opening ratio (or aperture ratio) of the display panel can be increased by reducing the width of the black matrix of the present invention.

Second Embodiment

FIG. 9A~FIG. 9D are cross-section views showing a method of fabricating a color filter substrate according to a second embodiment of the present invention. The black matrix of the second embodiment also comprises a plurality strip patterns, each strip pattern has a side portion distant from the substrate and extending to the edge of the adjacent pixel regions. The method of forming the strip patterns of the black matrix is described as follows.

Figure 9A:
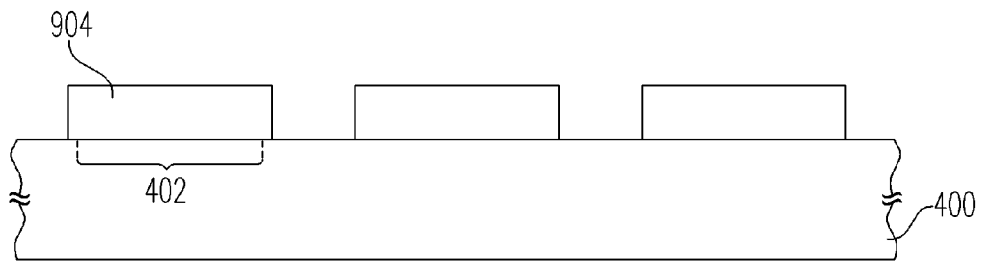
FIG. 9A~FIG. 9D are cross-section views showing a method of fabricating a color filter substrate according to a second embodiment of the present invention.

As shown in FIG. 9A, the substrate 400 has a plurality of pixel regions 402 thereon. Then, a plurality of auxiliary patterns 904 are formed on the substrate 400. Each auxiliary pattern 904 extends from the inside of each pixel region 402 to the edge of each pixel region 402. In other words, each auxiliary pattern 904 covers the substrate 402 in each pixel region 402 and has an area larger than that of each pixel region 402.

Figure 9B:
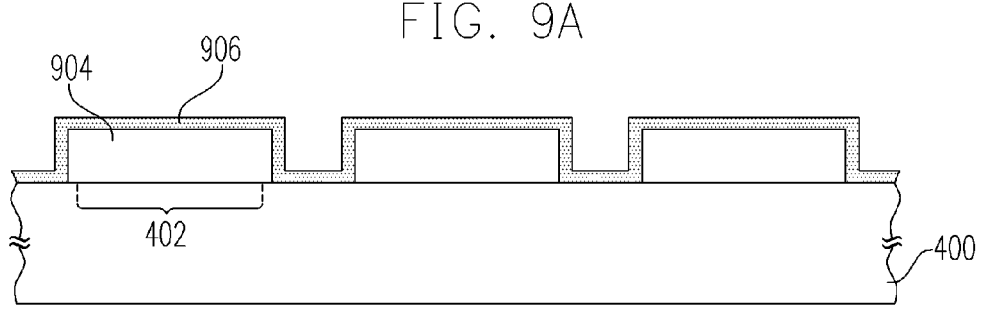

As shown in FIG. 9B, a conformal shielding layer 906 is formed over the substrate 400 to cover the auxiliary patterns 904. The material of the shielding layer 906 and the method of forming the same are similar to that of the shielding layer 411 in FIG. 5C.

Figure 9C:
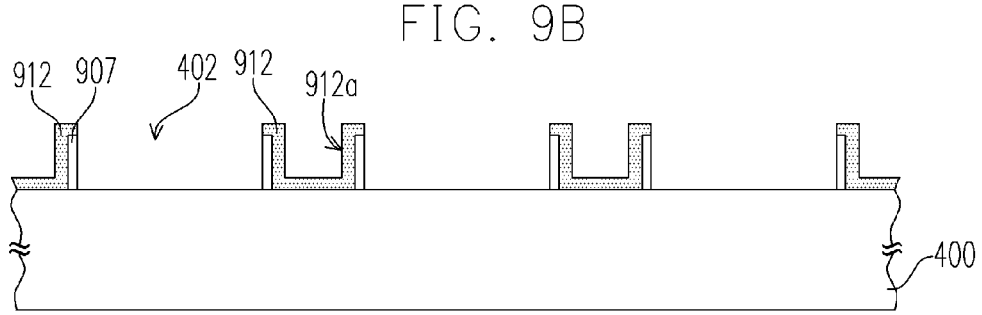
Figure 10:
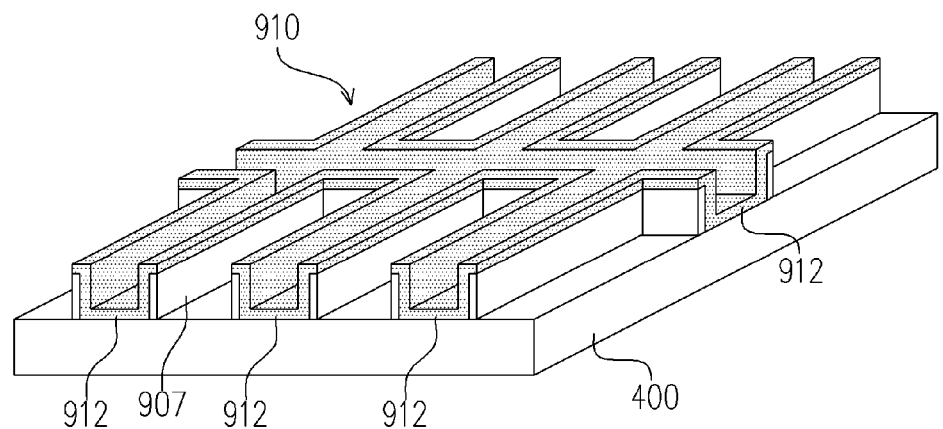
FIG. 10 is a perspective view showing a black matrix on a substrate according to the second embodiment of the present invention.

As shown in FIG. 9C, the shielding layer 906 and the auxiliary patterns 904 in the pixel regions 402 are removed to expose the substrate 400 inside the pixel regions 402. Thus, a plurality of strip patterns 912 having a side portion 912a are formed, wherein the side portion 912a is distant from the substrate 400 and extends to the edge of the adjacent pixel regions 402 so that a black matrix 910 is formed, as shown in FIG. 10. In particular, the auxiliary patterns around the pixel regions 402 are remained on the side portion 912a of the strip pattern 912 and be named as protrusions 907 herein.

Figure 9D:
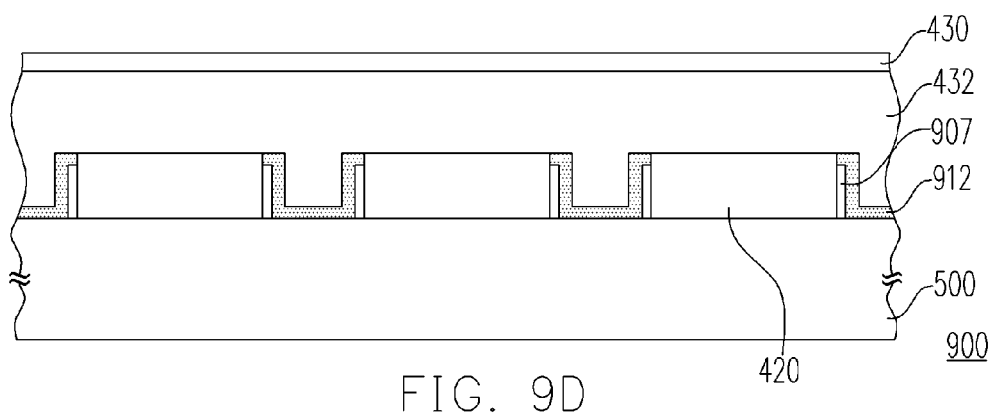

As shown in FIG. 9D, after forming the black matrix 910 of FIG. 10, the steps of forming a color pattern 420 in each pixel region 402, forming a planarizing layer 432 and forming a common electrode 430 to cover the black matrix 910 and the color filter patterns 910 are performed to form a color filter substrate 900. These steps are similar to that described in the first embodiment.

The difference between the first and second embodiments is that the strip patterns of the black matrix are different, and the other elements in the first and second embodiments are the same or similar.

Please refer to FIG. 4C and FIG. 9, the strip pattern 412 of the first embodiment in FIG. 4C has a side portion 412a distant from the substrate 400, and the side portion 412a and the substrate 400 has an included angle smaller than 90 degree, and the side portion 412a extends to the edge of the adjacent pixel regions 402. In the second embodiment of FIG. 9, the side portion 912a of the strip pattern 912 leans on the protrusion 907 and extends to the edge of the adjacent pixel regions 402.

Figure 11:
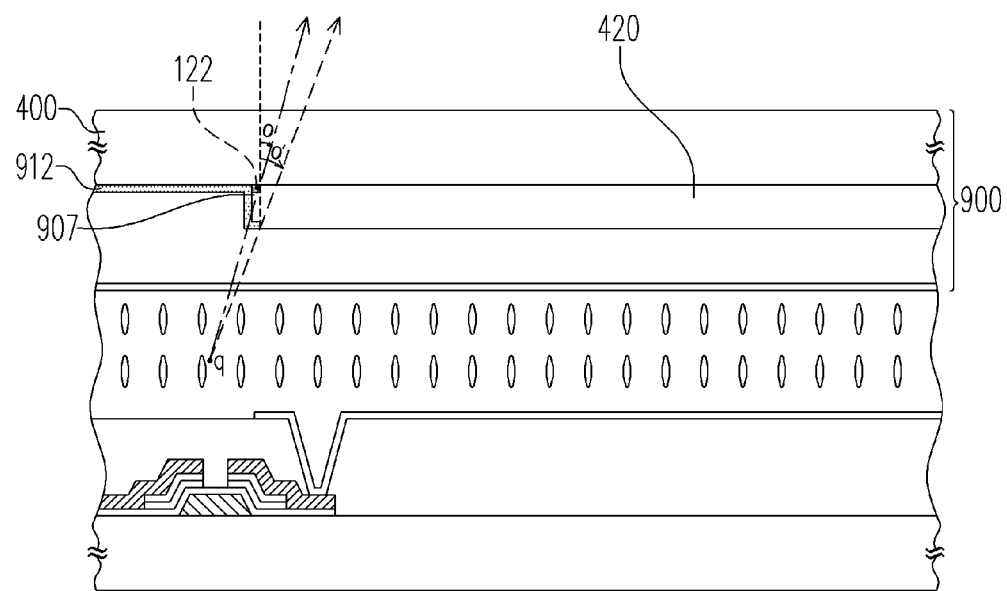
FIG. 11 is a cross-section view showing a liquid crystal display panel having the color filter substrate of the second embodiment therein.

The structure of the strip patterns 912 of FIG. 9D are not identical to that of the strip patterns 412 of FIG. 4C, but both the side portion 912a of the strip pattern 912 and the side portion 412a of the strip pattern 412 are distant from the substrate so that the color filter substrate 900 has advantages similar to that of the color filter substrate 408 of FIG. 4C. FIG. 11 is a cross-section view showing a liquid crystal display panel having the color filter substrate 900 of FIG. 9D therein. The liquid crystal display panel FIG. 11 also has a wider viewing angle without deteriorating the opening ratio.

Third Embodiment

Figure 12A:
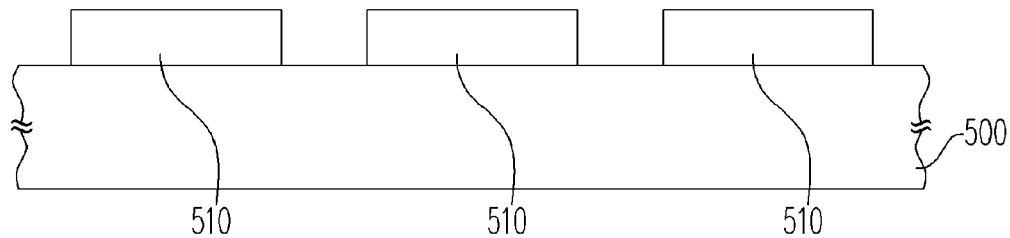
FIG. 12A~FIG. 12D are cross-section views showing a method of fabricating a color filter substrate according to a third embodiment of the present invention.

FIG. 12A~FIG. 12D are cross-section views showing a method of fabricating a color filter substrate according to a third embodiment of the present invention. As shown in FIG. 12A, a plurality of color filter patterns 510 are formed on a substrate 500. The method, material and arrangement of the color filter patterns 510 are the same or similar to that of the color filter patterns 410 in the second embodiment. In addition, several alignment marks (not shown) may also be formed on the substrate 500 so as to make sure that the color filter patterns can be accurately formed in the predetermined regions of the substrate 500. For example, before forming the color filter patterns 510, a laser chemical vapor depositing process is carried out to form the alignment marks on the substrate 500. Then, the color filter patterns 510 are formed on the substrate 500 in accordance with these alignment marks.

Figure 12B:
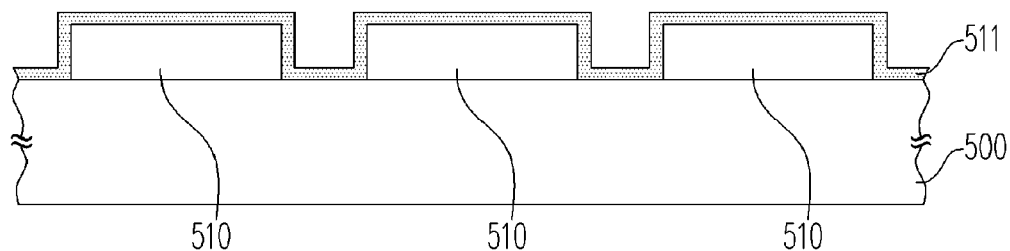
Figure 12C:
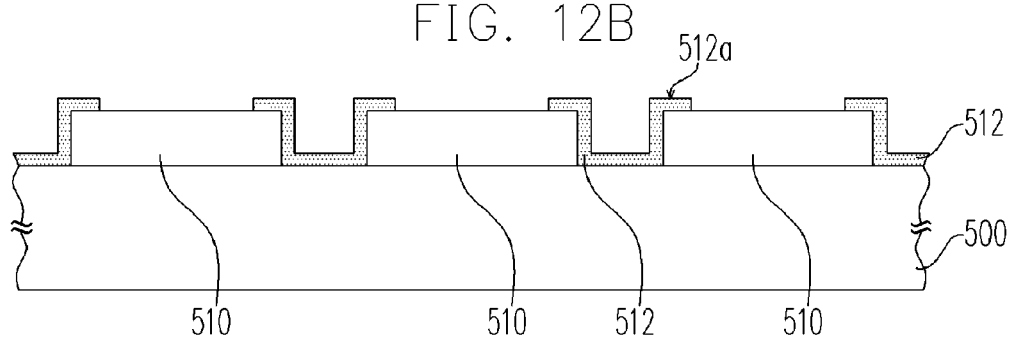

As shown in FIG. 12B, a shielding layer 511 is formed over the substrate 500. The shielding layer 511 is patterned so as to remove a portion of the shielding layer 511 on each color filter pattern 510 to form a plurality of strip patterns 512, as shown in FIG. 12C. Thus, a black matrix constituted of these strip patterns 512 is formed. In particular, each strip pattern 512 has a side portion 512a covering a portion of each color filter pattern 510.

Figure 12D:
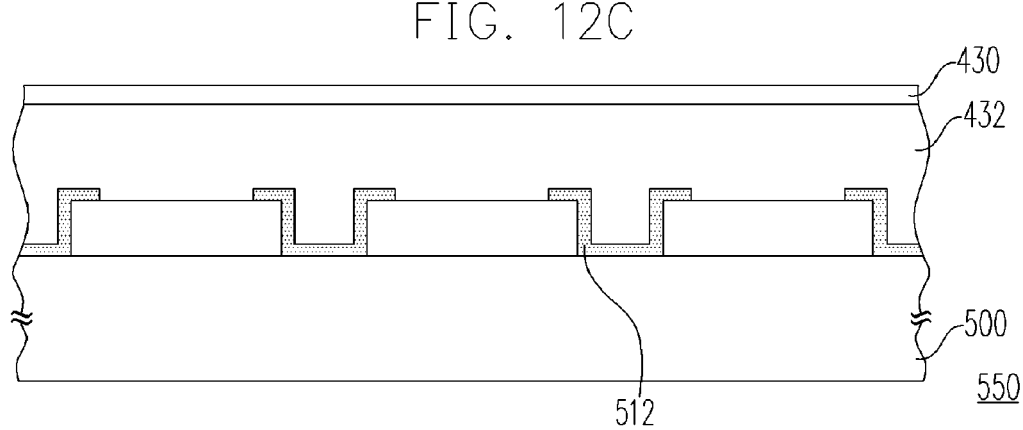

As shown in FIG. 12D, after forming the color filter patterns 510 and the black matrix 512, the sequential steps comprising forming a planarizing layer 532 and forming a common electrode 430 covering the black matrix 512 and the color filter patterns 510 are performed. These steps are similar to that described in the first and second embodiments. Hence, a color filter substrate 550 is completed.

Figure 13:
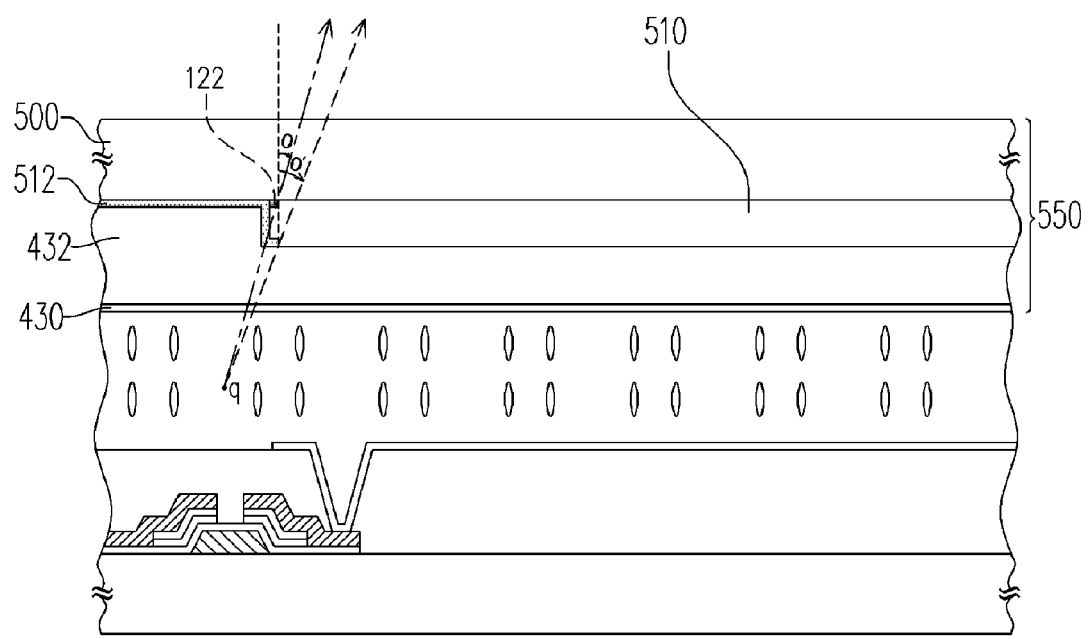
FIG. 13 is a cross-section view showing a liquid crystal display panel having the color filter substrate of the third embodiment therein.

In the embodiment, the side portion 512a of the strip pattern 512 covers a portion of each color filter pattern 510. The side portion 512a of the strip pattern 512 is also distant from the substrate 500 so that the color filter substrate 550 has advantages similar to that of the color filter substrate in the two above mentioned embodiments. FIG. 13 is a cross-section view showing a liquid crystal display panel having the color filter substrate 550 of FIG. 12D therein. The liquid crystal display panel FIG. 13 also has a wider viewing angle without deteriorating the opening ratio.

For the foregoing, the strip patterns of the black matrix of the color filter substrate has a side portion distant from the substrate so as to prevent light leakage at a wider viewing angle. Since the width of the black matrix is not increased in the present invention, the liquid crystal display panel of the present invention has a wider viewing angle without deteriorating the opening ratio (or aperture ratio). Therefore, the liquid crystal display panel has advantages of wider viewing angle and good displaying contrast.

Moreover, if the viewing angle of the display panel is maintained similar to the conventional condition, the opening ratio (or aperture ratio) of the display panel can be increased by reducing the width of the black matrix of the present invention so as to improve displaying quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of fabricating a color filter substrate, comprising:
   providing a substrate having a plurality of pixel regions thereon;
   forming a plurality of strip patterns between the pixel regions to form a black matrix to isolate the pixel regions, wherein each strip pattern has a side portion distant from the substrate and extending to the edge of the adjacent pixel regions, and a method of forming the black matrix comprises:
      forming a first mask pattern in each pixel region, wherein a top portion of each first mask pattern has a width smaller than that of a bottom portion of each first mask pattern;
      forming a second mask pattern on each first mask pattern, wherein a top portion of each second mask pattern has a width larger than that of a bottom portion of each second mask pattern;
      forming a shielding layer on top portions of the second mask patterns, and forming the black matrix on the substrate between the first mask patterns at the same time, wherein the black matrix is separated from the shielding layer;
      removing the shielding layer, the second mask patterns, and the first mask patterns;
   forming a color filter pattern in each pixel region; and
   forming a common electrode over the substrate to cover the color filter patterns and the black matrix.

2. The method of fabricating the color filter substrate according to claim 1, wherein a method of forming the shielding layer and the black matrix at the same time comprises performing a deposition process, and the depositing process comprises a physical vapor deposition, a plasma enhanced chemical vapor deposition, an evaporation process or a coating process.

3. The method of fabricating the color filter substrate according to claim 1, wherein the second mask patterns have a shape of trapezoid having a top width larger than a bottom width.

4. The method of fabricating the color filter substrate according to claim 1, wherein each second mask pattern has at least protruding portion on its top portion.

5. A method of fabricating a color filter substrate, comprising:
   providing a substrate having a plurality of pixel regions thereon;
   forming a plurality of strip patterns between the pixel regions to form a black matrix to isolate the pixel regions, wherein each strip pattern has a side portion distant from the substrate and extending to the edge of the adjacent pixel regions, and a method of forming the black matrix comprises:
      forming a plurality of auxiliary patterns on the substrate, wherein each auxiliary pattern extends from the inside of each pixel region to the edge of each pixel region;
      forming a conformal shielding layer over the substrate to cover the auxiliary patterns; and
      removing the shielding layer and the auxiliary patterns in the pixel region so as to form a plurality of protrusions by the remaining auxiliary patterns around the pixel regions, and form the black matrix on the substrate, wherein the side portion of each strip pattern leans on each of the protrusion correspondingly;
   forming a color filter pattern in each pixel region; and
   forming a common electrode over the substrate to cover the color filter patterns and the black matrix.

6. The method of fabricating the color filter substrate according to claim 5, wherein forming the shielding layer comprises performing a physical vapor deposition, a plasma enhanced chemical vapor deposition, an evaporation process or a coating process.

7. The method of fabricating the color filter substrate according to claim 5, wherein after forming the color filter patterns and before forming the common electrode, further comprises forming a planarizing layer over the substrate to cover the color filter patterns and the black matrix.

8. A color filter substrate, comprising:
   a substrate having a plurality of pixel regions thereon;
   a black matrix comprising a plurality of strip patterns, wherein the strip patterns are disposed between the pixel regions to isolate the pixel regions, and each strip pattern has a side portion distant from the substrate and extending to the edge of the adjacent pixel region;
   a plurality of color filter patterns, each color filter pattern is disposed in each pixel region;
   a plurality of protrusions, disposed between each strip pattern and each color filter pattern, and the side portion of each strip pattern is leaned on each the protrusion correspondingly; and
   a common electrode over the substrate and covering the color filter patterns and the black matrix.

9. The color filter substrate according to claim 8, wherein the color filter patterns comprises at least one red filter pattern, at least one green filter pattern and at least one blue filter pattern.

10. The color filter substrate according to claim 8, wherein the black matrix is a multi-layer structure.

11. The color filter substrate according to claim 8, wherein the black matrix comprises a non-transparent metal material or a photo-sensitive black organic material.

12. The color filter substrate according to claim 8, further comprising a planarizing layer disposed between the common electrode and the color filter patterns and the black matrix.

* * * * *